United States Patent
Yan

(10) Patent No.: US 9,798,152 B2
(45) Date of Patent: Oct. 24, 2017

(54) LIQUID CRYSTAL PANEL AND METHOD FOR THE MANUFACTURE THEREOF, AND A 3D DISPLAY APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventor: Wei Yan, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 98 days.

(21) Appl. No.: 14/421,855

(22) PCT Filed: Jul. 28, 2014

(86) PCT No.: PCT/CN2014/083105
§ 371 (c)(1),
(2) Date: Feb. 16, 2015

(87) PCT Pub. No.: WO2015/131475
PCT Pub. Date: Sep. 11, 2015

(65) Prior Publication Data
US 2016/0266394 A1  Sep. 15, 2016

(30) Foreign Application Priority Data
Mar. 7, 2014  (CN) .......................... 2014 1 0084049

(51) Int. Cl.
*G02F 1/1337* (2006.01)
*G02B 27/22* (2006.01)
(Continued)

(52) U.S. Cl.
CPC ......... *G02B 27/2214* (2013.01); *G02B 27/22* (2013.01); *G02F 1/1337* (2013.01);
(Continued)

(58) Field of Classification Search
CPC ... G02F 1/133753; G02F 2001/133773; G02B 27/2214; G02B 27/22
See application file for complete search history.

(56) References Cited

U.S. PATENT DOCUMENTS 7,796,200 B2 * 9/2010 Chen .................. G02B 27/2214
349/117
2004/0239835 A1 12/2004 Jung
(Continued)

FOREIGN PATENT DOCUMENTS

CN  101000430  7/2007
CN  101158768  4/2008
(Continued)

OTHER PUBLICATIONS

Office action from Chinese Application No. 20140084049.X dated Jun. 3, 2016.
(Continued)

*Primary Examiner* — Kendrick Hsu
(74) *Attorney, Agent, or Firm* — Calfee, Halter & Griswold LLP

(57) ABSTRACT

There are disclosed a liquid crystal panel and method for the manufacture thereof, and a 3D display apparatus, for enabling left-eye and right-eye images to be separated directly by means of a liquid crystal cell and the manufacturing process of a naked-eye 3D mode liquid crystal cell to be simplified. The liquid crystal panel comprises an upper substrate, a lower substrate and a liquid crystal cell formed of liquid crystal molecules located between the upper and lower substrates. The liquid crystal cell comprises a display layer and a grating layer, the grating layer being arranged in proximity to the upper substrate, the grating layer comprising a light shielding region and a light transmitting region, the light shielding region comprising light shielding liquid crystal molecules, the light transmitting region comprising light transmitting liquid crystal molecules, the light shielding region and the light transmitting region being arranged alternately. The present disclosure provides a liquid crystal panel that is capable of separating left-eye and right-eye images directly by means of a liquid crystal cell and sim-
(Continued)

plifying the manufacturing process of a naked-eye 3D mode liquid crystal cell.

11 Claims, 3 Drawing Sheets

(51) Int. Cl.
*G02F 1/1335* (2006.01)
*G02F 1/1341* (2006.01)
*G02F 1/13363* (2006.01)

(52) U.S. Cl.
CPC ...... *G02F 1/1341* (2013.01); *G02F 1/133512* (2013.01); *G02F 1/133788* (2013.01); *G02F 2001/133631* (2013.01); *G02F 2001/133633* (2013.01)

(56) References Cited

U.S. PATENT DOCUMENTS

| | | | |
|---|---|---|---|
| 2005/0200781 | A1 | 9/2005 | Takatani |
| 2012/0300142 | A1* | 11/2012 | Kim .................. G02B 27/2214 349/15 |
| 2013/0248086 | A1* | 9/2013 | Hamada ................ G02F 1/1339 156/145 |
| 2014/0198271 | A1* | 7/2014 | Kizu .................... G02F 1/1337 349/15 |
| 2015/0015826 | A1* | 1/2015 | Mizusaki .............. C08F 220/18 349/61 |
| 2016/0139314 | A1* | 5/2016 | Inomata ............... G02B 5/3016 349/193 |

FOREIGN PATENT DOCUMENTS

| | | |
|---|---|---|
| CN | 102830546 | 12/2012 |
| CN | 103885229 | 6/2014 |
| TW | 201222103 | 6/2012 |
| TW | 201337350 | 9/2013 |

OTHER PUBLICATIONS

Office action from Chinese Application No. 20140084049.X dated Dec. 4, 2015.
International Search Report and Written Opinion from PCT/CN2014/083105 dated Nov. 28, 2014.
International Search Report and Written Opinion from PCT/CN2014/083105 dated Nov. 28, 2014 along with an English translation.

* cited by examiner

LIQUID CRYSTAL PANEL AND METHOD FOR THE MANUFACTURE THEREOF, AND A 3D DISPLAY APPARATUS

RELATED APPLICATIONS

The present application is the U.S. national phase entry of PCT/CN2014/083105, with an international filing date of Jul. 8, 2014, which claims the benefit of Chinese Patent Application No. 201410084049.X, filed Mar. 7, 2014, the entire disclosure of which is incorporated herein by reference.

TECHNICAL FIELD

The present disclosure relates to the technical field of displays, and in particular, to a liquid crystal panel and method for the manufacture thereof, and a 3D display apparatus.

BACKGROUND

An outside world view observed by the human eye is not planar, but rather stereoscopic in three dimensions with a depth of field. Such capability of perception of three dimensions stems from a distance of about 6.5 cm from the left eye to the right eye of a human being, as a result of which, a slight offset will take place when looking at the same object position, i.e. a parallax is generated. Using this parallax, images are produced for the left eye and the right eye respectively, upon which a three-dimensional (3D) picture can be observed. To this end, a user needs to be assisted by special spectacles with different polarized components for the left and right eyes, whereas such a 3D display mode requiring the spectacles to be worn causes inconvenience to the user, and meanwhile has the comfortableness for the user substantially reduced.

In order to improve on the inconvenience at the user watching a 3D display device, naked-eye 3D display techniques have lately been applied within wide range. In a naked-eye 3D display mode, the observer would be able to observe a 3D stereoscopic image without the assistance of other means such as the spectacles. At present, there are mainly two modalities of well-developed naked-eye 3D techniques, a first of which is cylindrical lens grating modality and a second is parallax barrier modality. These two traditional ways of forming a parallax both have their manufacturing processes presented with an additional laminating process subsequent to the making of the liquid crystal cell. As shown in FIG. 1, after the liquid crystal cell 10 is made, it is required to attach a lens 11, etc. externally to the liquid crystal cell, where the additional laminating process will increase the process difficulty and the production cost, and the overall thickness of a liquid crystal module to be made will also be increased, which in turn leads to certain difficulty in the subsequent machine-completing assembly of the liquid crystal modules.

In sum, the prior art naked-eye 3D processes are non-exclusively adding means, on a common liquid crystal cell, that can realize separation of the left-eye and right-eye images, e.g. a cylindrical lens and a second liquid crystal cell enabling spectroscopic control, whereby a more precise attaching process is required at a latter stage of the assembly to laminate the additional spectroscopic means and the liquid crystal cell together, which raised the difficulty of the process while increasing the process procedures.

SUMMARY

The embodiments of the present disclosure provide a liquid crystal panel and method for the manufacture thereof, and a 3D display apparatus, for enabling left-eye and right-eye images to be separated directly by means of a liquid crystal cell and the manufacturing process of a naked-eye 3D mode liquid crystal cell to be simplified.

According to an aspect of the present disclosure, a liquid crystal panel is provided and the panel comprises an upper substrate, a lower substrate and a liquid crystal cell formed of liquid crystal molecules located between the upper and lower substrates, the liquid crystal cell comprising a display layer and a grating layer, the grating layer being arranged in proximity to the upper substrate, the grating layer comprising a light shielding region and a light transmitting region, the light shielding region comprising light shielding liquid crystal molecules, the light transmitting region comprising light transmitting liquid crystal molecules, the light shielding region and the light transmitting region being arranged alternately.

For a liquid crystal panel provided by one embodiment of the present disclosure, since the liquid crystal cell comprises a display layer and a grating layer, wherein the grating layer is arranged in proximity to the upper substrate and the grating layer comprises a light shielding region and a light transmitting region, with the light shielding region comprising light shielding liquid crystal molecules, the light transmitting region comprising light transmitting liquid crystal molecules, and the light shielding region and the light transmitting region arranged alternately, the liquid crystal panel of the embodiment of the present disclosure is capable of separating left-eye and right-eye images directly by means of the liquid crystal cell and simplifying the manufacturing process of a naked-eye 3D mode liquid crystal cell.

Preferably, the light shielding region is arranged with a first alignment film, and the light transmitting region is arranged with a second alignment film.

In this way, when the light shielding region is arranged with the first alignment film and the light transmitting region is arranged with the second alignment film, simplicity and convenience are enabled in the real production.

Preferably, the first alignment film is a vertical alignment film, and the second alignment film is a horizontal alignment film.

In this way, when the first alignment film is a vertical alignment film and the second alignment film is a horizontal alignment film, simplicity and convenience are enabled in the real production.

Preferably, a width of the first alignment film is the same as that of the second alignment film.

In this way, when the width of the first alignment film is the same as that of the second alignment film, simplicity and convenience are enabled in the real production.

Preferably, a total width Q of the first alignment film and second alignment film satisfies:

$$Q:2P=D:(D+G),$$

wherein, P represents the width of a subpixel for the liquid crystal panel, D represents the vertical distance between the eye of an observer and the upper substrate, and G represents the distance between the upper substrate and the lower substrate.

In this way, when the total width Q of the first alignment film and second alignment film satisfies the formula Q: 2P=D: (D+G), wherein P represents the width of a subpixel for the liquid crystal panel, D represents the vertical distance between the eye of the observer and the upper substrate, and G represents the distance between the upper substrate and the lower substrate, a 3D image can be observed with convenience in the real production.

The embodiments of the present disclosure also provide a 3D display apparatus, which comprises the aforesaid liquid crystal panel.

For a 3D display apparatus provided by an embodiment of the present disclosure, since the display apparatus comprises the aforesaid liquid crystal panel, the display apparatus is capable of separating left-eye and right-eye images directly by means of a liquid crystal cell and simplifying the manufacturing process of a naked-eye 3D mode liquid crystal cell.

The embodiments of the present disclosure further provide a method for the manufacture of a liquid crystal panel, the method comprising:

cell aligning an upper substrate and a lower substrate to form a liquid crystal cell;

injecting liquid crystal molecules into the liquid crystal cell, wherein the liquid crystal cell comprises a display layer and a grating layer, the grating layer being arranged in proximity to the upper substrate, the grating layer comprising a light shielding region and a light transmitting region, the light shielding region comprising light shielding liquid crystal molecules, the light transmitting region comprising light transmitting liquid crystal molecules, the light shielding region and the light transmitting region being arranged alternately.

Since the method for the manufacture of the liquid crystal panel provided by an embodiment of the present disclosure comprises: cell aligning an upper substrate and a lower substrate to form a liquid crystal cell; injecting liquid crystal molecules into the liquid crystal cell, wherein the liquid crystal cell comprises a display layer and a grating layer, the grating layer being arranged in proximity to the upper substrate, the grating layer comprising a light shielding region and a light transmitting region, the light shielding region comprising light shielding liquid crystal molecules, the light transmitting region comprising light transmitting liquid crystal molecules, the light shielding region and the light transmitting region being arranged alternately, the method for the manufacture of the liquid crystal panel, as provided by an embodiment of the present disclosure, is capable of separating left-eye and right-eye images directly by means of the liquid crystal cell and simplifying the manufacturing process of a naked-eye 3D mode liquid crystal cell.

Preferably, the grating layer being arranged in proximity to the upper substrate comprises:

manufacturing an alignment film having photosenstive characteristics on one side of the upper substrate facing the lower substrate, such that the alignment film comprises a plurality of first alignment films and second alignment films that are strip-like and alternately distributed in the vertical direction; wherein, the first alignment film is an alignment film formed after the irradiation of polarized ultraviolet (UV) light, and a long-axis direction of the liquid crystal molecules within the region at a predetermined distance facing directly the first alignment film is perpendicular to a plane where the alignment film resides.

In this way, since the grating layer being arranged in proximity to the upper substrate comprises: manufacturing an alignment film having photosensitive characteristics on one side of the upper substrate facing the lower substrate, such that the alignment film comprises a plurality of first alignment films and second alignment films that are strip-like and alternately distributed in the vertical direction; wherein, the first alignment film is an alignment film formed after the irradiation of polarized ultraviolet (UV) light, and a long-axis direction of the liquid crystal molecules within the region at a predetermined distance facing directly the first alignment film is perpendicular to a plane where the alignment film resides, the method for the manufacture of the liquid crystal panel, as provided by an embodiment of the present disclosure, is capable of separating left-eye and right-eye images directly by means of the liquid crystal cell and simplifying the manufacturing process of a naked-eye 3D mode liquid crystal cell.

Preferably, the alignment film comprising a plurality of first alignment films and second alignment films that are strip-like and alternately distributed in the vertical direction comprises:

shielding the alignment film using a mask with light transmitting areas and non-transmitting areas that are strip-like and alternately distributed in the vertical direction, and irradiating the mask by polarized UV light, where the molecules in the alignment film corresponding to a transmitting area of the mask undergo a decomposition reaction and form the first alignment film; the region corresponding to a non-transmitting area of the mask forms the second alignment film.

In this way, since the alignment film is shielded using a mask with light transmitting areas and non-transmitting areas that are strip-like and alternately distributed in the vertical direction, and the mask is irradiated by polarized UV light, where the molecules in the alignment film corresponding to a transmitting area of the mask undergo a decomposition reaction and form the first alignment film, and the region corresponding to a non-transmitting area of the mask forms the second alignment film, the composition of a plurality of first alignment films and second alignment films that are strip-like and alternately distributed in the vertical direction can be obtained simply and conveniently in the real production process.

Preferably, the method further comprises:

subsequent to injecting the liquid crystal molecules into the liquid crystal cell, irradiating the liquid crystal cell by UV light, such that the liquid crystal molecules within a region facing directly the alignment film are caused into a polymerization reaction with the molecules in the alignment film, to secure the alignment of the liquid crystal molecules in polymerization reaction with the alignment film.

In this way, since the method further comprises: subsequnt to injecting the liquid crystal molecules into the liquid crystal cell, irradiating the liquid crystal cell by UV light, such that the liquid crystal molecules within a region facing directly the alignment film are caused into a polymerization reaction with the molecules in the alignment film, to secure the alignment of the liquid crystal molecules in polymerization reaction with the alignment film, an alignment of the liquid crystal molecules directly facing the alignment film can be secured simply and conveniently in the real production process.

DESCRIPTION OF EMBODIMENTS

The present disclosure provides a liquid crystal panel and method for the manufacture thereof, and a 3D display apparatus, for enabling left-eye and right-eye images to be separated directly inside a liquid crystal cell and the manufacturing process of a naked-eye 3D mode liquid crystal cell to be simplified.

Figure 1:
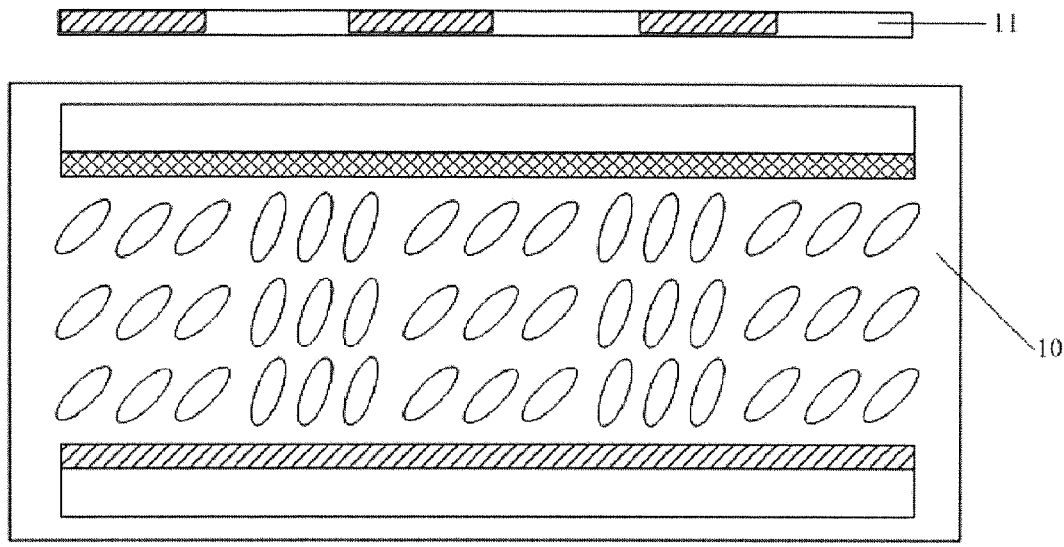
FIG. 1 is a schematic diagram of the structure of a liquid crystal panel enabling naked-eye 3D display in the prior art.
Figure 2:
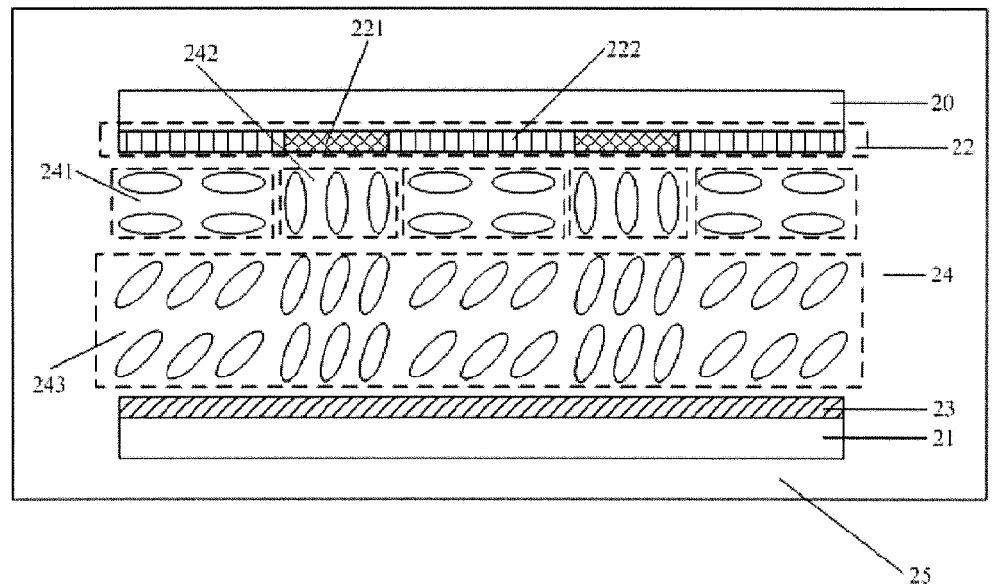
FIG. 2 is a schematic diagram of the structure of a liquid crystal panel provided by one embodiment of the present disclosure.

As shown in FIG. 2, one embodiment of the present disclosure provides a liquid crystal panel, which panel comprises an upper substrate 20, a lower substrate 21 and liquid crystal molecules 24 located between the upper substrate 20 and the lower substrate 21. The upper substrate 20 and the lower substrate 21 are cell aligned to form a liquid crystal cell 25. The liquid crystal panel provided by one embodiment of the present disclosure further comprises an alignment film 22 having photosenstive characteristics located on one side of the upper substrate 20 facing the lower substrate 21, wherein the alignment film 22 comprises a plurality of first regions 221 and second regions 222 that are strip-like and alternately distributed in the vertical direction. The first region 221 is irradiated by polarized UV light such that a long-axis direction of the liquid crystal molecules 242 within the region proximate to and facing directly the first region 221 is perpendicular to a plane where the alignment film 22 resides.

The second region 222 of the alignment film 22 is the region not irradiated by the polarized UV light. By means of the intermolecular force between the molecules in the alignment film 22 having photosensitive characteristics and the liquid crystal molecules 241 directly facing the second region 222, a long-axis direction of the liquid crystal molecules 241 within a region facing directly the second region 222 is made parallel to the plane where the alignment film 22 resides. The first region 221 of the alignment film 22 is the region formed after being irradiated by the polarized UV light. The irradiated partial polymer chains in the first region 221 of the alignment film 22 with photosensitive characteristics undergo a decomposition reaction, thereby causing, by means of the intermolecular force between the molecules in the alignment film 22 having photosensitive characteristics and the liquid crystal molecules 242 directly facing the first region 221, a long-axis direction of the liquid crystal molecules 242 within a region facing directly the first region 221 to be perpendicular to the plane where the alignment film 22 resides.

In one embodiment of the present disclosure, an alignment film 23 on the lower substrate 21 is a same alignment film resulted from a rubbing alignment as the prior art, and during display of the liquid crystal panel, the liquid crystal molecules 243 located on the alignment film 23 are used for normal display.

As shown in FIG. 2, a liquid crystal cell in the liquid crystal panel provided by one embodiment of the present disclosure comprises a display layer, a grating layer consisting of liquid crystal molecules 241 and liquid crystal molecules 242, and an alignment film. The grating layer is arranged in proximity to the upper substrate 20, and the grating layer comprises a light shielding region and a light transmitting region. The light shielding region comprises light shielding liquid crystal molecules 242 and the light transmitting region comprises light transmitting liquid crystal molecules 241, with the light shielding region and the light transmitting region arranged alternately. The light shielding region is arranged with a first alignment film, corresponding to the first region 221 of the alignment film 22 in the figure, and the light transmitting region is arranged with a second alignment film, corresponding to the second region 222 of the alignment film 22 in FIG. 2.

In an actual production design, the width of the first region 221 may be different than the width of the second region 222 depending on the production process. In one embodiment, it is preferable that the width of a first region 221 be the same as the width of a second region 222 in the alignment film 22. In one embodiment of the present disclosure, the alignment film 22 is polymide PI with photosensitive properties.

Unless otherwise defined, the technical terms or scientific terms used herein should be of the universal meanings understood by persons having ordinary skills in the art of the present disclosure. The words "first", "second" and others alike used in the description and claims of the patent application of the present disclosure do not represent any order, number or priority of importance, but are instead for distinguishing different composite parts. Also, the words "a", "an" or "the", etc. do not represent any limit on number, but instead represent the presence of at least one. Such words as "comprise" or "include" mean that the element or means preceding that word covers the enumerated elements or means or equivalents thereof following that word, without excluding other elements or means. Those of "upper", "lower", "left", "right", "bottom", "top" and so on are used merely for conveying certain relative positional relationships, and when the described object changes its absolute position, such relative positional relationships may also change accordingly.

Figure 3:
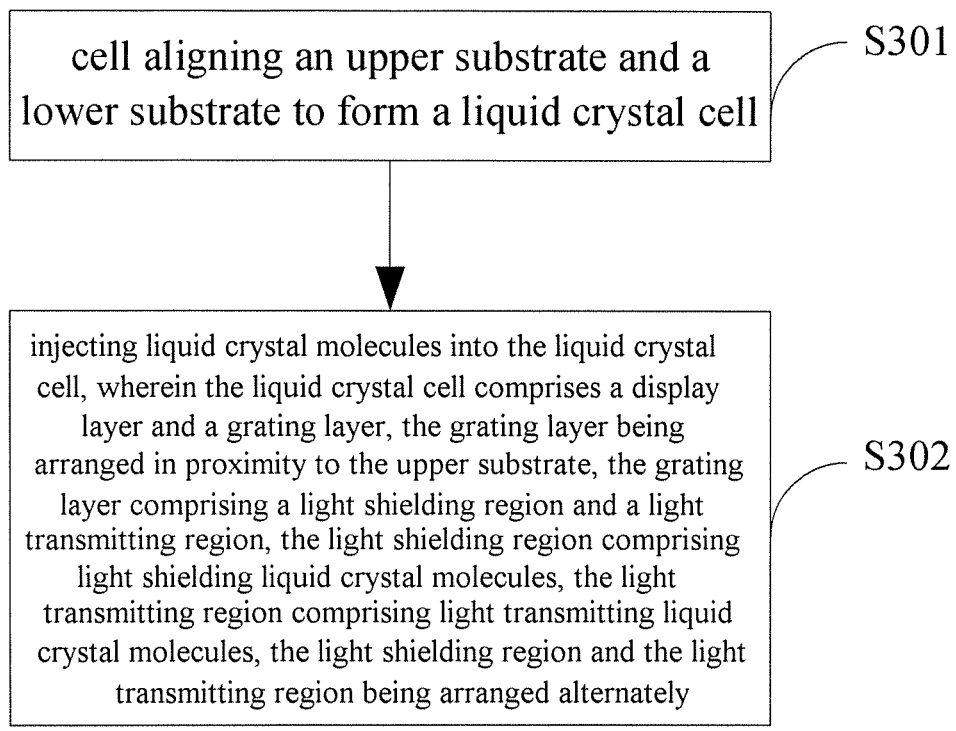
FIG. 3 is a flow chart of a method for the manufacture of a liquid crystal panel provided by another embodiment of the present disclosure.

As shown in FIG. 3, one embodiment of the present disclosure also provides a method for the manufacture of a liquid crystal panel, the method comprising:

Step S301, cell aligning an upper substrate and a lower substrate to form a liquid crystal cell; and Step S302, injecting liquid crystal molecules in the liquid crystal cell, wherein, the liquid crystal cell comprises a display layer and a grating layer, the grating layer is arranged in proximity to the upper substrate, the grating layer comprises a light shielding region and a light transmitting region, the light shielding region comprises light shielding liquid crystal molecules and the light transmitting region comprises light transmitting liquid crystal molecules, and the light shielding region and the light transmitting region are arranged alternately.

In the following a process of a naked-eye 3D display implemented with a liquid crystal panel provided by a specific embodiment of the present disclosure is introduced in detail.

Figure 4:
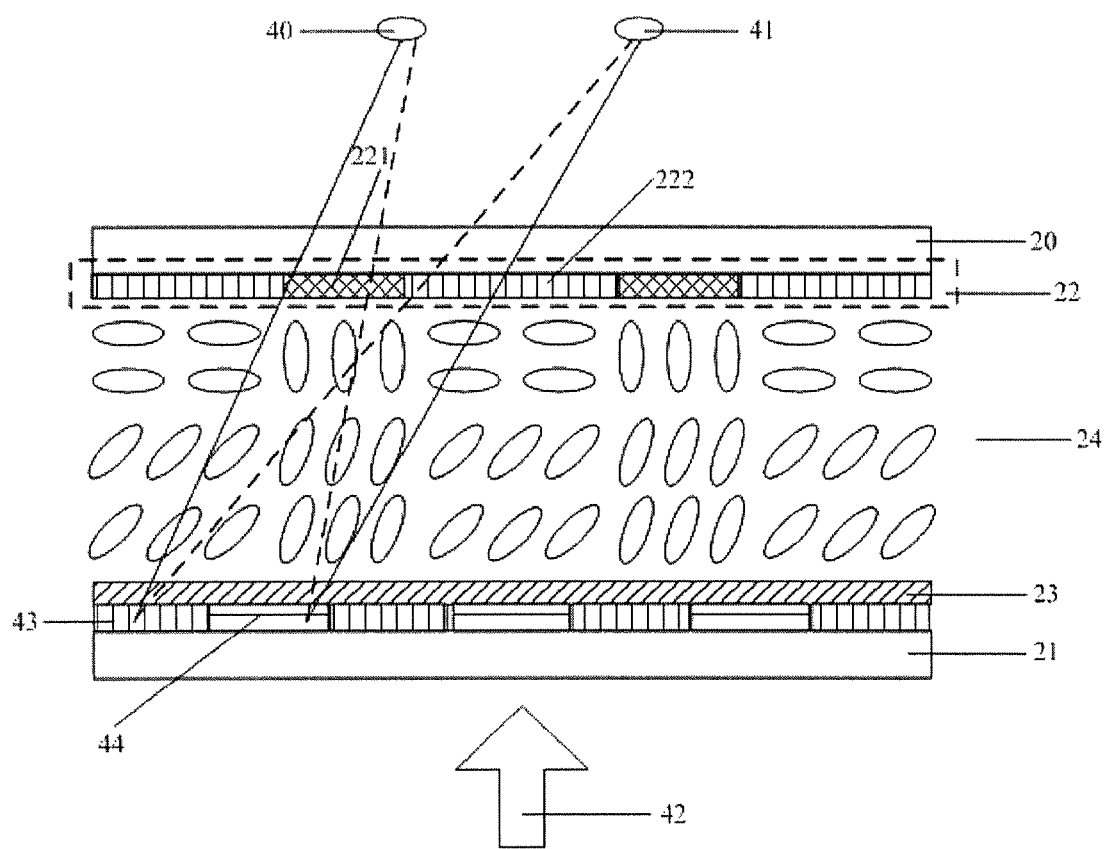
FIG. 4 is a schematic diagram of a liquid crystal panel in implementing naked-eye 3D display provided by a further embodiment of the present disclosure.

As shown in FIG. 4, in one embodiment of the present disclosure, the alignment film 22 is shielded by using a mask with light transmitting areas and non-transmitting areas that are strip-like and alternately distributed in the vertical direction, and the mask is irradiated by polarized UV light, where partial polymer chains in the alignment film 22 that correspond to the transmitting areas of the mask undergo a decomposition reaction and form first regions 221 of the alignment film 22; the regions corresponding to the non-transmitting areas of the mask form second regions 222 of the alignment film 22. Next, the upper substrate 20 and the lower substrate 21 are cell aligned to form a liquid crystal cell, into which liquid crystal molecules 24 are injected, wherein a long-axis direction of the liquid crystal molecules within the region at a predetermined distance facing directly the first region 221 is perpendicular to the plane where the alignment film 22 resides, and the value of the predetermined distance herein varies in different processes. Preferably, the predetermined distance in one embodiment of the present disclosure is 0.1 μm-0.5 μm. Rather than presenting limit, in a specific embodiment of the present disclosure, the distance is specifically related to the timing and intensity of the polarized UV light irradiation.

In addition, in order to better secure the alignment of the liquid crystal molecules in a region facing directly the alignment film 22, the liquid crystal cell is irradiated by UV light, and preferably, a direction of the UV light irradiation is the same as that of the light from a light source 42 in the figure, upon which the liquid crystal molecules in the regions facing directly the first region 221 and the second region 222 will be caused into a polymerization reaction with the molecules in the alignment film 22, securing in the figure the liquid crystal molecules perpendicular to the alignment film 22 and the liquid crystal molecules parallel to the alignment film 22, so that the alignment of the liquid crystal molecules perpendicular to the alignment film 22 and the liquid crystal molecules parallel to the alignment film 22 is better ensured not to be affected by a change in the electric field.

As shown in FIG. 4, in one embodiment of the present disclosure, the process of distinguishing a left-eye and a right-eye image is specifically: since a 3D display is carried out with subpixels, wherein a column of subpixels display the left-eye image and an adjacent column of subpixels display the right-eye image, illustration is now provided by the example of a leftmost subpixel 43 as the light radiated from the light source 42 passes the lower substrate 21. The light emitted by the light source 42 travels past the liquid crystal molecules parallel to the alignment film 22 before it arrives at a left eye 40 through the liquid crystal panel, where since the liquid crystal molecules parallel to the alignment film 22 can let through the polarized light, the left eye can observe the image of this pixel; the light emitted by the light source 42 travels past the liquid crystal molecules perpendicular to the alignment film 22 before it arrives at a right eye 41 through the liquid crystal panel, where since the liquid crystal molecules perpendicular to the alignment film 22 cannot let through the polarized light, the right eye cannot observe the image of this pixel, i.e. the leftmost subpixel 43 is visible to the left eye. For a subpixel 44 adjacent to the leftmost subpixel 43, the light emitted by the light source 42 travels past the liquid crystal molecules perpendicular to the alignment film 22 before it arrives at the left eye 40 through the liquid crystal panel, where since the liquid crystal molecules perpendicular to the alignment film 22 cannot let through the polarized light, the left eye cannot observe the image of this pixel; the light emitted by the light source 42 travels past the liquid crystal molecules parallel to the alignment film 22 before it arrives at the right eye 41 through the liquid crystal panel, where since the liquid crystal molecules parallel to the alignment film 22 can let through the polarized light, the right eye can observe the image of this pixel, i.e. the subpixel 44 is visible to the right eye. By analogy, left-eye and right-eye images over the entire liquid crystal panel are alternated in this way for realization ultimately the objective that each of the images is observed by the left eye and the right eye respectively. Accordingly, in one embodiment of the present disclosure, by arranging the alignment film 22 to cooperate with a light controlled alignment, the liquid crystal molecules perpendicular to the alignment film 22 and the liquid crystal molecules parallel to the alignment film 22 are allowed for an arrangement to form a parallax barrier, thus effecting a separation of left-eye and right-eye images and achieving finally a 3D stereoscopic display.

As shown in FIG. 4, in one embodiment of the present disclosure, to realize alternate left-eye and right-eye images over the entire liquid crystal panel as described above and finally enable each of the images to be observed by the left and right eyes respectively, it is also required to design for the relevant distances, specifically: Q: 2P=D: (D+G), wherein Q represents the total width of a first region 221 and a second region 222 of the alignment film 22; P represents the width of a liquid crystal panel subpixel, e.g. the width of subpixel 43; D represents the vertical distance between an eye of the observer and the upper substrate 20; and G represents the distance between the upper substrate 20 and the lower substrate 21. Additionally, the distance E between the left eye 40 and the right eye 41 of the observer satisfies E: P=D: G, where a 3D stereoscopic vision can be acquired as long as the proportion expression is satisfied.

One embodiment of the present disclosure also provides a display apparatus comprising the above liquid crystal panel. Preferably, the liquid crystal panel in the present disclosure is an Advanced Super Dimension Switch (ADS) type or an In-Plane-Switching (IPS) type of liquid crystal panel.

It is evident that various modifications and variations to the present disclosure can be made by persons skilled in the art without departing from the spirit and scope of the present disclosure. In this way, if these modifications and variations to the present disclosure belong to the scope of the claims and equivalent technologies thereof, the present disclosure is intended to include these modifications and variations.

The invention claimed is:

1. A liquid crystal panel comprising an upper substrate, a lower substrate and a liquid crystal cell formed of liquid crystal molecules located between the upper and lower substrates, the liquid crystal cell comprising:
   a display layer; and
   a grating layer, the grating layer being arranged in proximity to the upper substrate, the grating layer comprising:
      a light shielding region, the light shielding region comprising light shielding liquid crystal molecules; and
      a light transmitting region, the light transmitting region comprising light transmitting liquid crystal molecules;
      wherein the light shielding region and the light transmitting region being arranged alternately;
   wherein the light shielding region is arranged with a first alignment film and the light transmitting region is arranged with a second alignment film; and
   wherein the first alignment films and second alignment films are strip-like and alternately distributed in the vertical direction.

2. The liquid crystal panel of claim 1, wherein the first alignment film is a vertical alignment film and the second alignment film is a horizontal alignment film.

3. The liquid crystal panel of claim 2, wherein a width of the first alignment film is the same as that of the second alignment film.

4. The liquid crystal panel of claim 3, wherein a total width Q of the first alignment film and second alignment film satisfies:

$$Q:2P=D:(D+G),$$

wherein, P represents the width of a subpixel for the liquid crystal panel, D represents the vertical distance between the eye of an observer and the upper substrate, and G represents the distance between the upper substrate and the lower substrate.

5. A 3D display apparatus, wherein the display apparatus comprising a liquid crystal panel according to claim 4.

6. A 3D display apparatus, wherein the display apparatus comprising a liquid crystal panel according to claim 3.

7. A 3D display apparatus, wherein the display apparatus comprises a liquid crystal panel according to claim 1.

8. A 3D display apparatus, wherein the display apparatus comprising a liquid crystal panel according to claim 2.

9. A method for the manufacture of a liquid crystal panel, the method comprising:
   cell aligning an upper substrate and a lower substrate to form a liquid crystal cell;
   injecting liquid crystal molecules into the liquid crystal cell, the liquid crystal cell comprises a display layer and a grating layer, the grating layer being arranged in proximity to the upper substrate, the grating layer comprising a light shielding region and a light transmitting region, the light shielding region comprising light shielding liquid crystal molecules, the light transmitting region comprising light transmitting liquid crystal molecules, the light shielding region and the light transmitting region being arranged alternately;
   wherein the grating layer being arranged in proximity to the upper substrate comprises:
   manufacturing an alignment film having photosensitive characteristics on one side of the upper substrate facing the lower substrate, such that the alignment film comprises a plurality of first alignment films and second alignment films that are strip-like and alternately distributed in the vertical direction;

wherein, the first alignment film is an alignment film formed after the irradiation of polarized ultraviolet (UV) light, and a long-axis direction of the liquid crystal molecules within the region at a predetermined distance facing directly the first alignment film is perpendicular to a plane where the alignment film resides.

10. The method of claim 9, wherein a method of manufacturing the alignment film comprising a plurality of first alignment films and second alignment films that are strip-like and alternately distributed in the vertical direction comprises:
   shielding the alignment film using a mask with light transmitting areas and non-transmitting areas that are strip-like and alternately distributed in the vertical direction, and
   irradiating the mask by polarized UV light, where the molecules in the alignment film corresponding to a transmitting area of the mask undergo a decomposition reaction and form the first alignment film; the region corresponding to a non-transmitting area of the mask forms the second alignment film.

11. The method of claim 9, wherein the method further comprises:
   irradiating the liquid crystal cell by UV light subsequent to injecting the liquid crystal molecules into the liquid crystal cell, such that the liquid crystal molecules within a region facing directly the alignment film are caused into a polymerization reaction with the molecules in the alignment film, to secure the alignment of the liquid crystal molecules in polymerization reaction with the alignment film.

\* \* \* \* \*